US005109534A

United States Patent [19]

Naito et al.

[11] Patent Number: 5,109,534

[45] Date of Patent: Apr. 28, 1992

[54] CABLE COMMUNICATION SYSTEM WITH TRANSMISSION LINE INCORPORATED IN HOSE

[75] Inventors: Osamu Naito, Machida; Seiji Ozaki, Matsudo; Koichi Inai, Hachioji, all of Japan

[73] Assignee: Teikoku Sen-I Co., Ltd., Tokyo, Japan

[21] Appl. No.: 324,235

[22] Filed: Mar. 15, 1989

[30] Foreign Application Priority Data

Apr. 15, 1988 [JP] Japan .............................. 63-51034[U]
Apr. 15, 1988 [JP] Japan .............................. 63-93994

[51] Int. Cl.[5] ...................... A62C 27/00; F16L 11/12

[52] U.S. Cl. ...................................... 455/66; 169/24; 174/47; 174/131 A; 340/320

[58] Field of Search .................... 455/66, 68, 70, 102, 455/103, 337; 169/24; 239/570; 174/47, 413 C, 131 A; 200/61.58 R; 340/320

[56] References Cited

U.S. PATENT DOCUMENTS

| | | | |
|---|---|---|---|
| 3,786,869 | 1/1974 | McLoughlin . | |
| 3,943,312 | 3/1976 | Bernstein et al. | 200/61.58 R |
| 3,974,879 | 8/1976 | Nelson, Jr. et aL. | 169/43 |
| 3,981,618 | 9/1976 | Nelson, Jr. | 417/12 |
| 4,179,319 | 1/1988 | Tighe, Jr. | 174/113 C |
| 4,189,005 | 2/1980 | McLoughlin | 169/24 |
| 4,199,761 | 4/1980 | Whyte et al. | 340/695 |
| 4,263,554 | 4/1981 | Keane | 328/134 |
| 4,683,349 | 7/1987 | Takebe | 174/113 C |

FOREIGN PATENT DOCUMENTS

| | | |
|---|---|---|
| 0219469 | 4/1987 | European Pat. Off. . |
| 102774 | 5/1987 | Japan . |
| 0097127 | 4/1989 | Japan . |
| 1549882 | 8/1979 | United Kingdom . |

*Primary Examiner*—Curtis Kuntz
*Assistant Examiner*—Chi H. Pham
*Attorney, Agent, or Firm*—McGlew & Tuttle

[57] ABSTRACT

An improvement is attained in a cable communication system of the type having communication line incorporated in the interior of a water supply hose which comprises, in combination, signal transmission cable incorporated extending in the interior of the water supply hose for the communication between a water injection nozzle and a fire-engine; a leading end coupling adapter for leading the signal transmission cable incorporated in the water supply hose to the outside for the connection to a communication exchange disposed on the part of the water injection nozzle for communication with the fire-engine and/or a transmitter for the control of the current amount of water to be supplied; and a communication exchange for mutual communication with the water injection nozzle and/or a water supply controller for the control of the current amount of water to be supplied to the nozzle disposed on the part of the fire engine to be connected operative to the signal transmission cable. With such an arrangement, it is possible in practice to communicate from the part of the water injection nozzle tc the fire engine, and also control the opening of water supply valve as well as the output of the engine.

9 Claims, 15 Drawing Sheets

CABLE COMMUNICATION SYSTEM WITH TRANSMISSION LINE INCORPORATED IN HOSE

FIELD OF THE INVENTION AND RELATED ART STATEMENT

The present invention relates to an improvement in or relating to a cable communication system with a water hose incorporating a communication line therein, and more particularly to a cable communication system for the communication with the personnel on the part of a fire engine for exchanging necessary commands and information as well as for the control of a flow rate of water to be supplied from the fire engine on the part of a fireman to adjust a switch means provided at the leading end of a hose or a water injection lance or nozzle.

On the scene of a fire, the distance between the fire site where firemen fight with a fire and a fire engine would naturally change from site to site on fire, and in a big urban region, in general, it would range from 100 to 150 meters for a common city resident area, while it would turn to be from 120 to 250 meters for a suburban area of a city.

By the way, according to the general organization of firemen, a team of firemen for one fire engine would generally be specified to be seven individuals or so, which are organized with a team leader, an engineer, fire-fighters or water-lancers and searchers, though this number and organization would change accordingly to the practical administrative or municipal regulations or other requirement.

In practice, however, it would frequently be difficult to certainly secure as many as seven men for the field activities in a fire site, and actually, it would then be the practice on many occasions such that only one man should work at the water-lance or nozzle of a hose.

In a practical fire-fighting activities under the support by fire-engines and the like equipment, there would be an occasion such that a rate of water supply should be controlled according to the circumstances of a fire. In this connection, it would generally be the practice to communicate by way of the radio communication or a message runner with the personnel staying on the part of a fire engine for the adjustment in a rate of water supply therefrom by, for instance, regulating the degree of stepping-down on the accelerator pedal of the engine.

In the practice of water supply from the fire engine, there are usually extended four or more water hoses from one fire engine, and hence there could be so many hoses extending in a fire site. In addition to such normal messes in the fire site, crosses and interferences in the wireless communication or lack in the number of men may occasionally occur, which would immediately become a considerable obstacle to the due communication concerning the current status at the fire site with the personnel staying on the part of the fire engine.

For the solution of such inconveniences, therefore, the prior art of, for instance, Japanese Patent Provisional Publication No. 102,774/1987, has been known, wherein the communication cable is incorporated extending in the interior of a water hose so that a due communication may be made available between the persons positioned on the opposite ends of a long extended water hose for the proper responses as required in a fire-fighting activities.

With such an arrangement of the prior art, however, a water lancer or fire-fighter who works at the far-distant leading end of the water hose is not allowed to directly operate the water supply valve or the engine control, it would be difficult for him to conduct his wanted actions accordingly to the current status of fire site which may change from time to time.

On the other hand, there was proposed a water supply control system installed on a fire engine by way of Japanese Patent Provisional Publication No. 102,774/1987 such that a fire-fighter working at the water lance of the hose at a fire site may remotely control the current amount of water by himself.

Referring simply to this prior art, firstly to FIG. 21, there are shown provided a transmitter 200 which is provided on part of the water lance or nozzle of a water hose and adapted by the operation of a hand switch to selectively output two types of signals by way of a high frequency carrier, a receiver 201 provided on the part of a fire engine and adapted to compare upon the demodulation of the outputted signals with the reference signal and determine of which this signal is, and a driver 202 adapted to control the rate of water flow by way of the signal from this receiver, the transmitter 200 and the receiver 201 being connected operatively across the opposite ends of the water hose by way of a cable 203 incorporated extending in the water hose, whereby the fire-fighter working at the nozzle of the hose may control the rate of water flow by shifting the switch of such as a push-button or the like installed on his part.

With such an arrangement, however, in consideration of such a messed situation in a fire site that there are usually four or more water hoses extending from one fire engine as noted hereinbefore, and additionally that a plurality of fire engines are normally sent to a fire site, there could naturally be quite many water hoses extending in a complex manner. In addition to such messes at a fire site, it is generally the practice that high frequency carrier signals are transmitted by way of the cables which are used as signal transmitting means incorporated within the water hose for the communication concerning the desired water flow rate by the communication system installed on the part of the fire engine.

For this reason, there may possibly occur such undesirable barriers as interference or electromagnetic induction between these water flow rate control systems, and consequently, this may be an inevitable cause of malfunction in the communication systems.

OBJECT AND SUMMARY OF THE INVENTION

The present invention has been made essentially in an attempt to overcome such problems, and it is an object of the invention to provide a useful communication system with a communication line incorporated in the interior of a water hose which is adapted to allow a single fire-fighter or water lancer man to directly control the current amount and pressure of water to be supplied and to report the current status of a fire site to the part of the fire engine which is located far away from the site.

It is another object of the invention to provide a useful communication system with a communication line incorporated in the interior of a water hose which is operable at the leading end or water lance of the hose and adapted to prevent the occurrence of interference or electromagnetic induction between the control systems incorporated in the water hoses which are usually laid in a complex manner extending from a plurality of fire engines as dispatched to a fire site.

The construction of a communication system according to the present invention which can afford the attainment of the objects noted above may be outlined in the following aspects (1) and (2);

(1) One feature of the present invention resides essentially in the construction such that a water lance or injection nozzle and a fire-fighter are connected operatively by way of a water supply hose with an electric signal communication line or cable incorporated extending in the interior thereof;

that the communication cable is introduced into the interior of the communication line-incorporated water supply hose through a leading-end adapter provided between the water injection nozzle and the water supply hose, the communication cable being connected to a communication unit for the exchange of messages with the part of fire engine and/or a signal transmitter for the control of a water supply controller; and that a communication unit for the exchange of messages with the part of water injection nozzle and/or a water supply controller for the control of water supply are provided to be connected operatively to the communication cable.

The water injection nozzle and the fire engine are connected operatively to each other by way of the communication line-incorporated water hose. To the bottom or tail end of the water injection nozzle, there is connected operatively the communication unit by way of the nozzle adapter for the exchange of messages with the fire engine by way of the communication unit.

On the other hand, the open/close operation of a valve provided on the part of the fire engine and the adjustment of an engine output may be performed by using the controller provided on the part of the communication unit so that water may be injected from the water injection nozzle against fire with the proper amount and pressure of water accordingly to the current status of a fire which may change from time to time.

(2) Another feature of the present invention resides essentially in the construction which comprises, as follows;

(a) a transmitter of the multiple-frequency coded type for use in the push-button public telecommunication line which is adapted by the manual operation of a switch to selectively output continuous speech frequency signals of at least two different frequencies is provided on the part of the injection nozzle of water hose;

(b) a signal discrimination unit of the push-button type for receiving the output signals to discriminate of which the received signal is; and (c) a driver unit for the control of the current amount of water to be supplied in accordance with the signal from the signal discrimination unit are provided on the part of the fire engine; and (d) the signal transmitter and the signal decision unit are connected operatively by way of two signal transmission lines which are incorporated in the interior of the water hose.

With the communication system with the communication line-incorporated water hose adaptable to be operated from the leading end of the hose of the construction stated above, a fire-fighter holding the water injection nozzle may operate the switch provided on the leading end of the water hose according to the current status of a fire site. By this operation of the switch, there will be either of the two types of signals outputted from the transmitter. In this output signal, a voice-frequency signal may be outputted correspondingly to the button switch which is pushed by the operator as in the signals outputted from the transmitter of the push-button type as used commonly in the automatic public telecommunication line.

This output signal is then passed to the signal discrimination unit of the push-button type which is provided on the part of a fire engine, where it is determined of which type this signal is, and also the driver is caused to be operated while the push-button switch is being pushed. With this driver being operated, the current amount and pressure of water to be supplied may be adjusted properly to control the flow rate of water to be supplied to the water hose, accordingly.

(3) Referring further to the aspect (2) above, a further feature resides in that the voice signal transmitter including a voice-frequency electric signal converter therein is connected in parallel to the transmitter noted above, and the voice signal transmitter is connected in parallel to the signal decision unit, so that the signal transmitting line may commonly be used for the transmission of the voice signals.

When a fire-fighter working at a fire site wishes to control by himself the current amount of water to be injected, he may send his messages immediately for the prior communication to any actions to be taken or for the information on the current status of a fire site by way of the electric voice signal converter and the signal transmission line.

According to the useful communication system according to the present invention, the following advantageous effects may be attained, that is (1) It is possible in practice to communicate with a fire engine from the far end of a water hose, or the water injection nozzle, and also open and close the water supply valve and adjust the engine output. As a consequence, it is now possible to make the control of the current amount of water to be supplied and of the current pressure of water to be injected from the water hose.

(2) This communication may be performed from the transmitter installed on the leading end of the water hose by manually operating the switch of the push-button type as used in the public telecommunication line to generate audio signals with different frequencies. For this reason, even if there are many laid water hoses extending extending in a mess and in a complex manner at a fire site, chances of such undesirable effect as interference and electromagnetic induction will efficiently be prevented from occurring between the control systems involved.

Consequently, it is now possible in practice to control the current amount of water to be supplied accordingly from the first-hand judgement on the part of a fire-fighter in reflection of the status of a fire, and also make prior communication or give a spot information on fire by way of the audio communication immediately with the part of a fire engine so that an appropriate action may be taken in accordance with the current status on fire which may change from time to time.

BRIEF DESCRIPTION OF THE DRAWINGS

FIGS. 5(A) and 5(B) through FIG. 8 are cross-sectional views showing the construction of a male-female common type coupling used in the invention, in which FIG. 5(A) is a longitudinal cross-sectional view showing the state that a hose is connected together, FIG. 5(B) is a right-hand side view of FIG. 5(A), FIG. 6 is a longitudinal cross-sectional view showing metal couplers to be coupled together, FIG. 7 is a perspective view showing the metal couplers detached from each other, and FIG. 8 is a perspective view showing the mating outer sleeves of the metal couplers;

FIGS. 19 and 20 are schematic views showing generally the use of a switch installed on the nozzle part, in which FIG. 19 shows a state that the water supply valve is operated and FIG. 20 shows a state that the engine's throttle valve is operated to control the revolution of an engine.

DETAILED DESCRIPTION OF PREFERRED EMBODIMENTS

The present invention will now be explained in detail by way of a first preferred embodiment thereof in conjunction with the accompanying drawings, as follows.

First Embodiment

Figure 1:
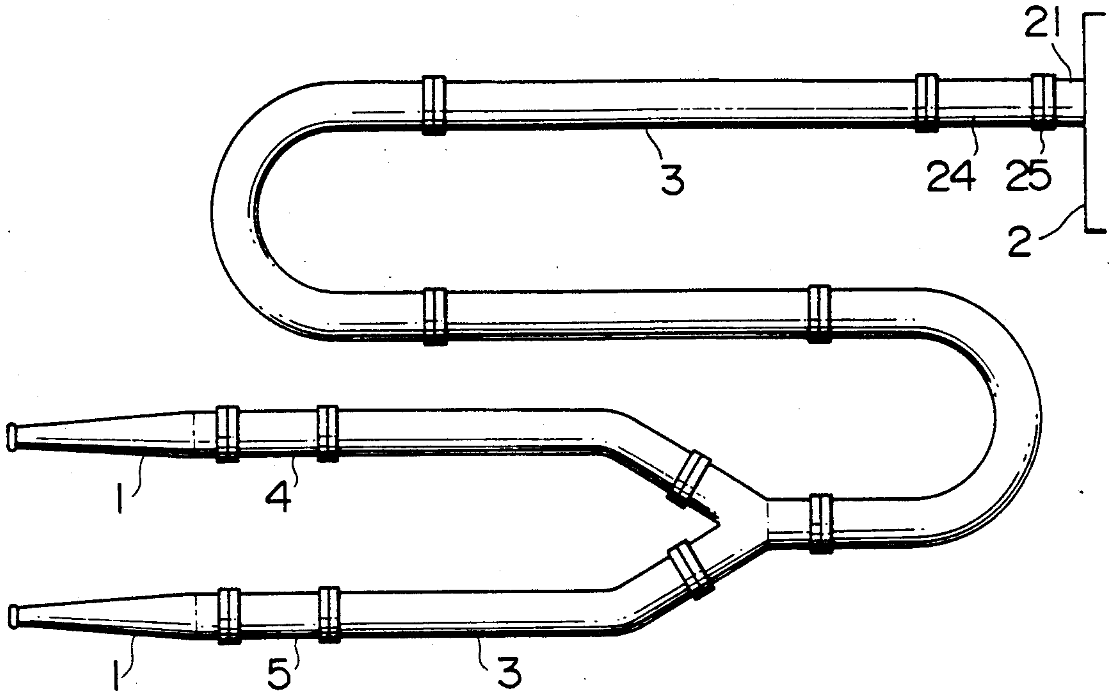
FIG. 1 is a schematic view showing the concept of a communication system with communication line-incorporated water hose by way of a first embodiment of the present invention.

Referring to FIG. 1, there is shown a schematic view showing generally a state that a pair of water lances or injection nozzles designated by the reference numeral 1 are connected operatively to a fire engine 2 by way of a water hose which incorporates a communication line therein.

These water injection nozzles 1 are connected respectively to the communication line-incorporated water hose 3 by way of nozzle adapters 4 and 5.

Figure 2:
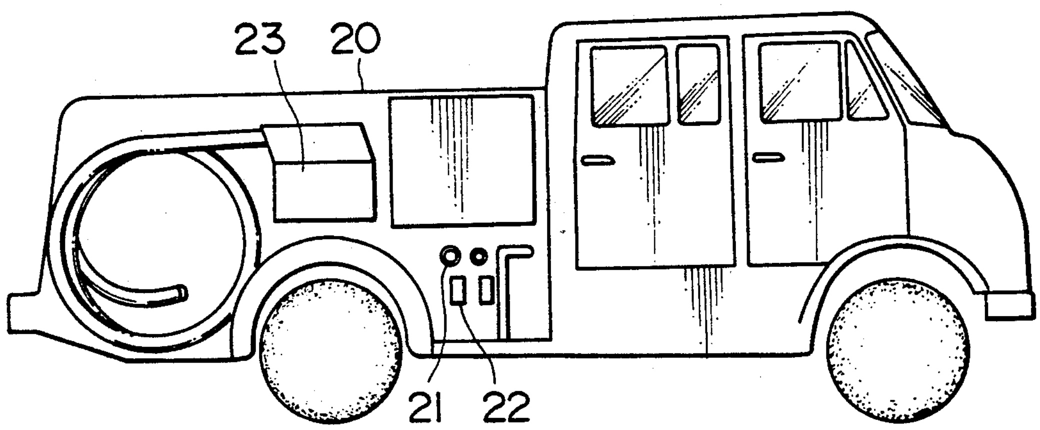
FIG. 2 is a schematic side view showing generally a fire engine.

On the other hand, referring to FIG. 2, there are provided a plurality of water supply valves 21, generally two on each side of a body portion 20 of a fire engine 2. These water supply valves 21 are designed to be closed and opened by the driving force from a drive motor 22, so that a current rate of water to be supplied and injected at a fire site may be controlled as desired. The control of the drive motor 22 is made with a control (to be described later) which is installed in a control panel 23 (to be described later) provided on the side of the engine body. In this control, there is incorporated a controller for the adjustment of a current pressure of water to be supplied by the control of a revolution number of the engine, and this controller may also be operated on the control panel 23.

A communication line-incorporated water hose assembly 3 is connected on its opposite end to the water nozzle end to one of the water supply valves 21 by way of a pump side adapter 24, and the connection of a hose end to this adapter 24 may be made by way of a coupler 25 to be described later.

Figure 3A:
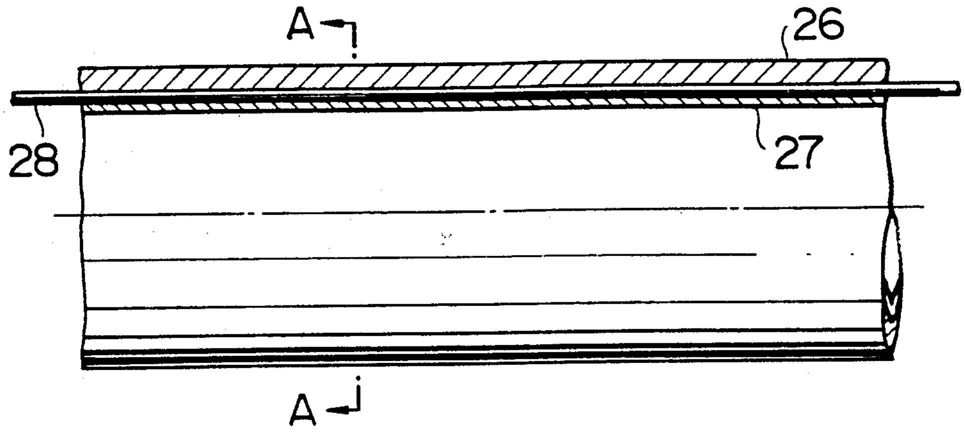
FIGS. 3(A) and 3(B) are schematic cross-sectional views, in which the former shows a line-incorporated water hose in a longitudinal cross section and the latter shows the hose of FIG. 3(A) in cross-section taken along the line A—A in the same figure.
Figure 3B:
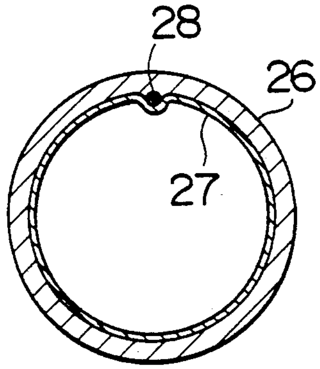
Figure 4:
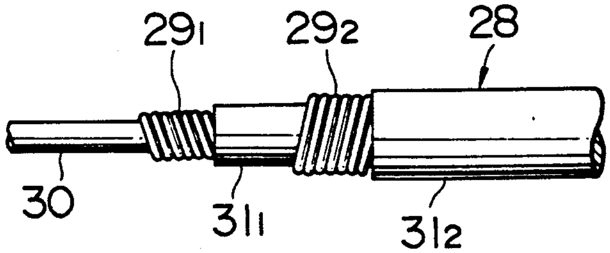
FIG. 4 is a conceptual fragmentary view showing a cable shown in FIG. 3 by way of a preferred embodiment of the invention.
Figure 5A:
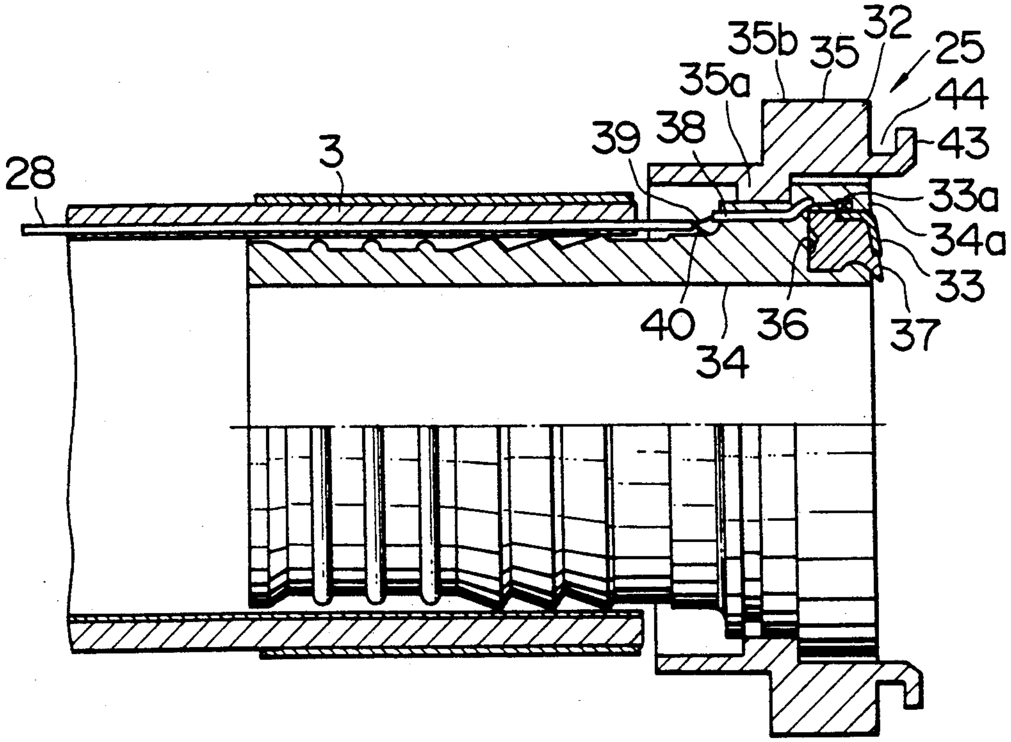
Figure 5B:
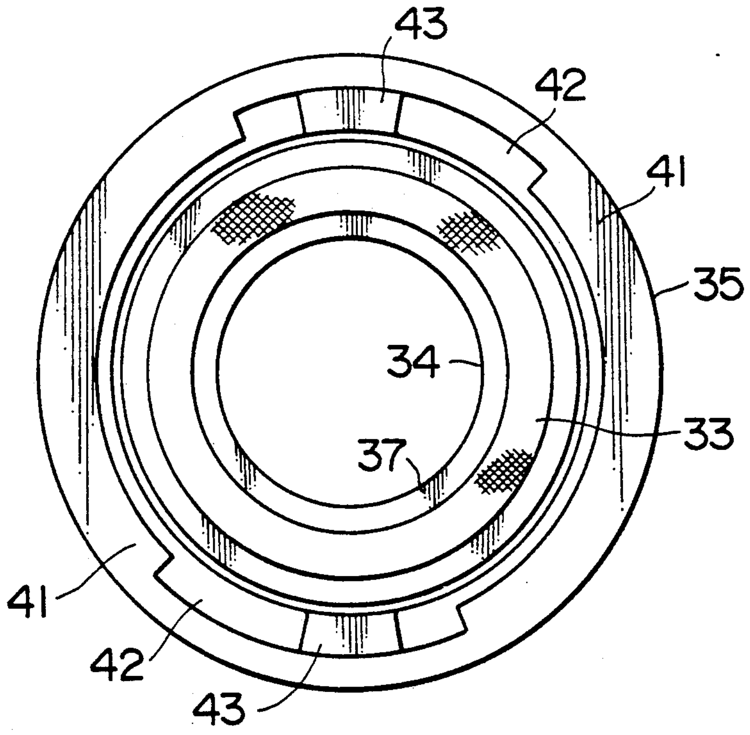

The communication line-incorporated water hose 3 is comprised, as typically shown in FIGS. 3(A) and (B), of a tubular hose jacket 26 and a lining tube of a plastic resin or a rubber 27 lined upon the interior surface of the hose jacket 26, and there is an electric cable 28 disposed in sandwiched fashion between the hose jacket 26 and the lining tube 27. This cable 28 comprises, as typically shown in FIG. 4, a copper wire $29_1$ wound spirally in one way around a core cord of polyester 30, a coating of polyvinyl chloride $31_1$ laid around the wound copper wire, a second copper wire $29_2$ would spirally yet in the opposite way to the copper wire $29_1$ around the polyvinyl chloride coating, and another coating of polyvinyl chloride $31_2$ laid around the second wound copper wire $29_2$, thus providing a coaxial cable. With this construction of the electric cable 28, it is designed specifically to withstand a stretch or elongation of 20 percent which is more than a possibility under the normal water pressure to be encountered during a fire-fighting operation. This cable 28 may also be adapted not only of this coaxial type but also of the common parallel twin-lead type to an equal effect.

On the opposite ends of this communication line-incorporated water hose 3, there are provided a metal coupling half 32, which may serve to provide a mutual connection between the communication line-incorporated water hoses 3, or to a variety of connecting adapters to be described later, or also between the electric cables 28 to be mated together.

For this metal coupling half 32, as a variety of types and constructions may be made available, there are typically shown certain examples of the male-female common type in FIGS. 5(A) and 5(B) through FIG. 8.

This metal coupling half 32 may be designed to be common in construction irrespective of whether it is of the male half 32*a* or the female half 32*b*, which coupling half is comprised of an annular conductor 33 disposed around the open end thereof, an inner sleeve 34 adapted to receive the communication line-incorporated water hose 3 on its outer surface of the free extension thereof, and an outer sleeve 35 adapted to be fitted onto the inner sleeve 34 and having a complementary connection part.

The inner sleeve 34 is formed with an annular recess or groove 36 extending circumferentially on the open end thereof, and there is an annular sealing member 37 inserted snugly into the annular recess 36. This sealing member 37 is provided with its inner-diametered portion projecting outwardly more than its outer-diametered portion in such a manner to form a projection from the end surface of the inner sleeve. There is mounted the annular conductor 33 on the outer circumference of the sealing member 37, with its one circumferential edge being bent to be fitted upon the outer end surface of the sealing member 37.

In this example shown, the annular conductor 33 is formed from wire net in an attempt to allow stretching in the axial direction with the netting axes being disposed at a certain angle with respect to the diametral direction of the inner sleeve 34.

Figure 9:
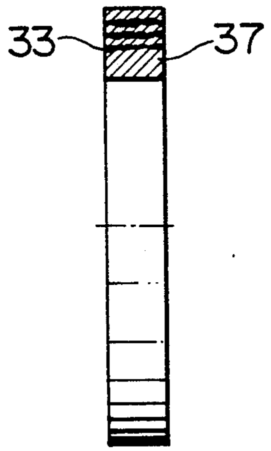
FIG. 9 is a fragmentary cross-sectional view showing an annular conductor ring and a sealing member.
Figure 10:
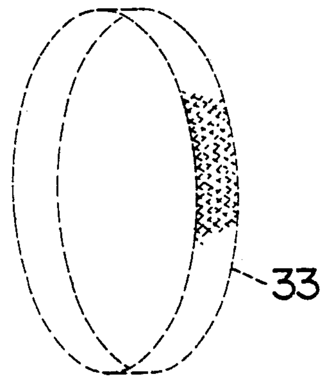
FIG. 10 is a perspective view showing the annular conductor ring.
Figure 11:
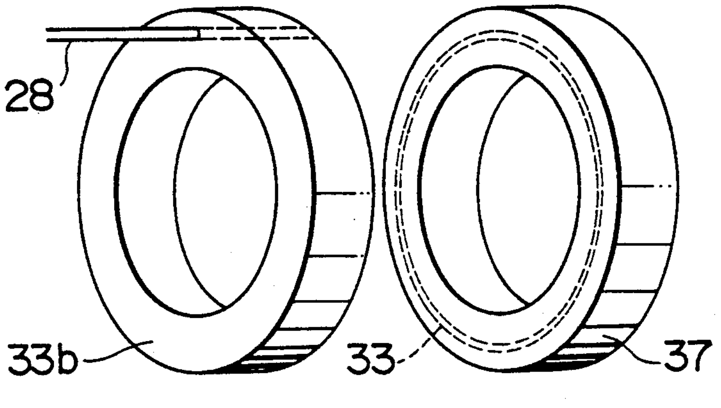
FIG. 11 is a perspective view showing the sealing member and a connecting terminal.

In the wall surface of the annular groove 36 with which the annular conductor 33 comes to contact slidably, there is provided a sliding conductor ring **33*a*, to which a lead wire 38 is connected extending through a flanged portion 34*a* of the inner sleeve 34. This lead wire 38 is further connected on its opposite end to the positive side of the electric cable 28 embedded in the communication line-incorporated water hose 3 extending on the outer circumferential surface of the inner sleeve 34. The negative side of the cable 28 is connected electrically to the inner sleeve 34 by way of soldering, for example. This annular conductor 33 may also be formed circumferentially upon the sealing member 37 as typically shown in FIGS. 9 through 11. In this arrangement, the electric lead wire 38 may be connected to an electric conductor 33*b* which is disposed immediately behind the sealing member 37**.

On the other hand, the outer sleeve 35 is adapted to fit detachably onto the outer circumference of the inner sleeve 34, and is fixed in position against the flanged portion **34*a* of the inner sleeve 34 from getting loose. The outer sleeve 35 is provided with a reduced-diametered portion 35*a* to fit onto the inner sleeve 34 and an opposed pair of flanges 41 extending radially inwardly in the symmetrical relationship with each other, and in these flanges there are formed an opposed pair of openings 42 and a like pair of greater-diametered portion 35*b* with a pair of complementary projections 43** formed therein.

The opposed pair of flanges 41 are formed extending with a given length along the circumferential edge of the open end inner circumference of the greater-diametered portion **35*b* of the outer sleeve, and with a thickness decreasing in continuation along the circumference from the opening 42. The complementary projections 43 are formed projecting with a given depth in the axial direction from the end surface of the inner sleeve 34, and with an annular recess 44 on the outer face of the outer sleeve for engagement with the flange 44** formed on the part of another coupling half to be mated together.

Figure 6:
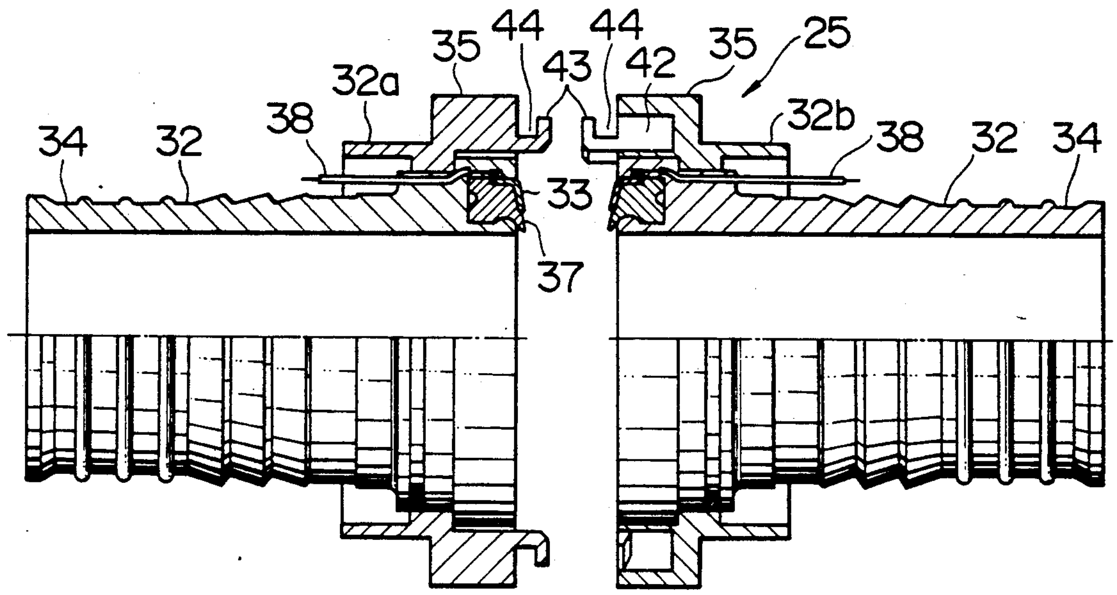
Figure 7:
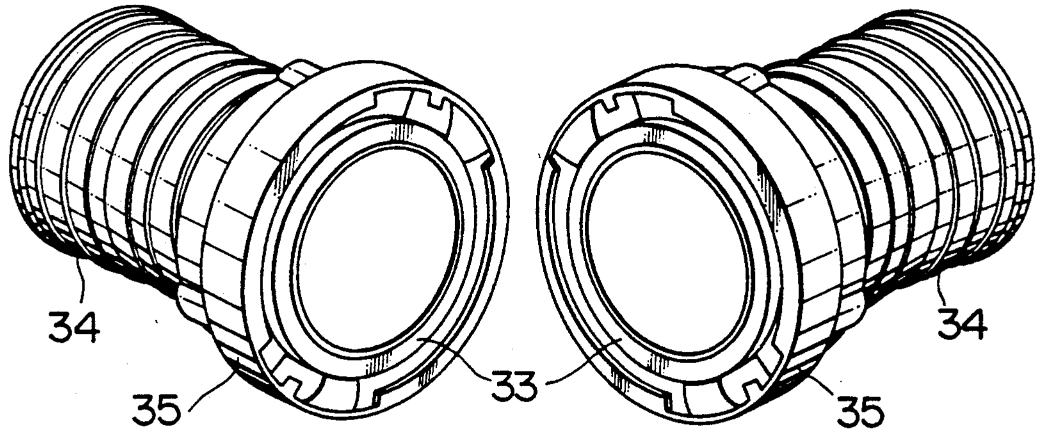
Figure 8:
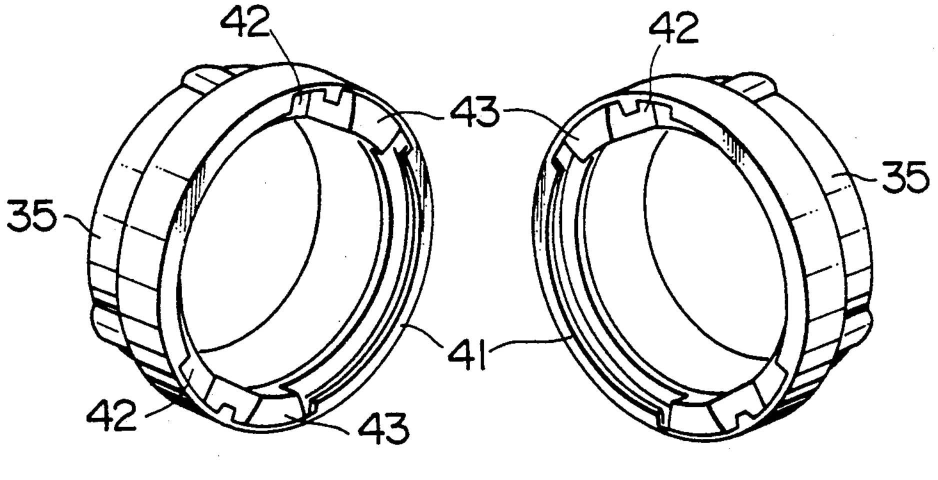

More specifically, as shown in FIG. 6 this metal coupling half assembly 32 is adapted to be coupled with another coupling half in such a manner that the complementary projection 43 on the part of a coupling half **32*a* may be put to exactly meet the opening 42 on the part of another coupling half 32*b*, and the complementary projection 43 on the part of the other coupling half 32*b* may then be put to exactly meet the opposed opening 42 on the part of the first copling half 32*a*** so as to be engaged respectively.

Then, when turning these coupling halves **32*a* and 32*b* in the opposite directions from each other, the complementary projections 43 may then come to be coupled with the opposed pair of flanges 41, respectively. Since the thickness of the complementary projection 43 is designed to be thinner in continuation, and as such turning motion of these coupling halves when mated together is continued, the both coupling halves 32*a* and 32*b* are forced towards each other till they are combined as a unit. In this manner, the sealing members 37 may become forced together under an increasing engaging force, with the annular conductors 33 on the oppossed counterparts being caused to contact closely with each other, thus having the electric cables 28 on the opposed pairs of communication line-incorporated water hose 3** connected together, accordingly.

Next, adapters serving to provide the connection of electric cables 28 will be explained, as follows.

Figure 12:
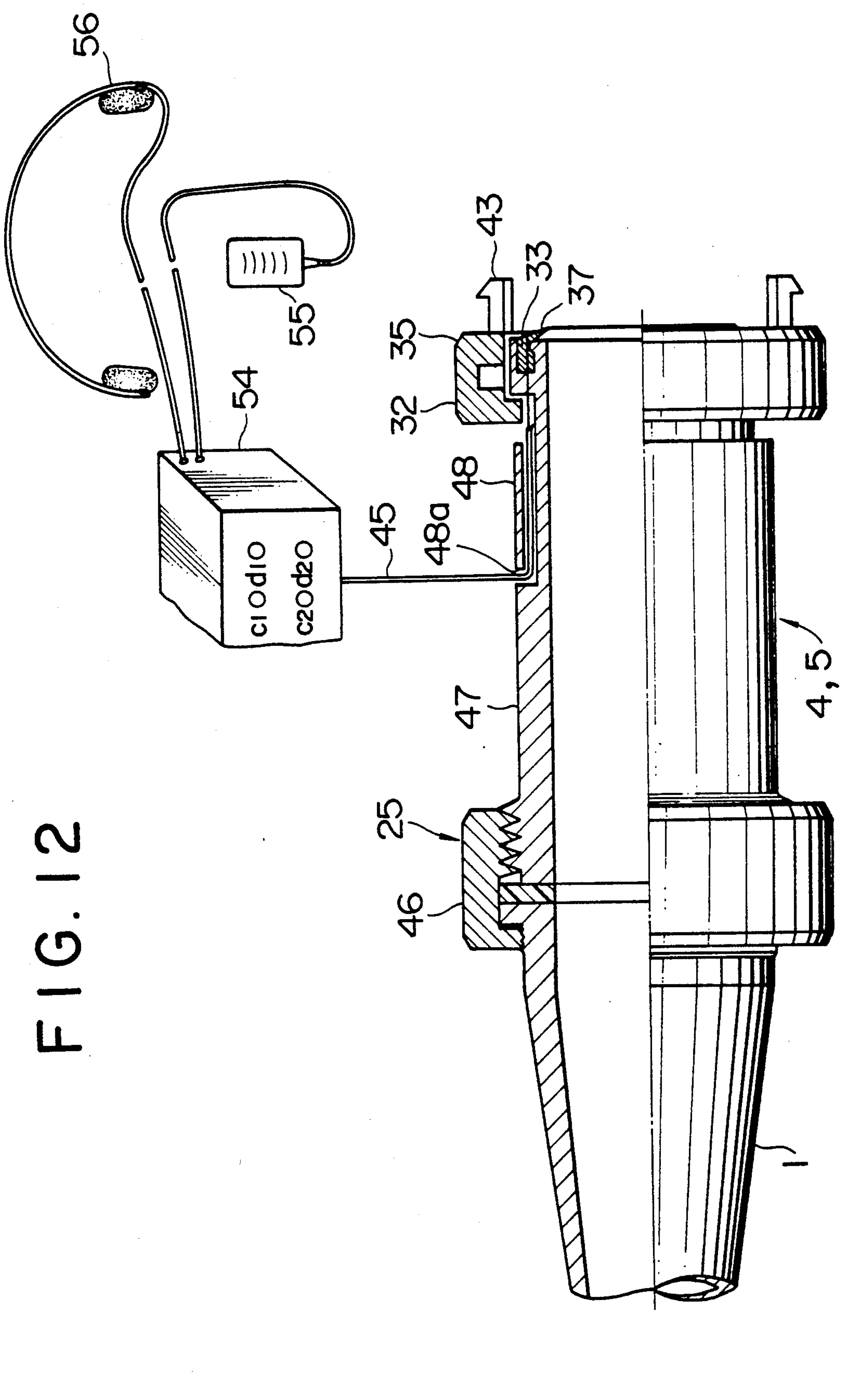
FIG. 12 is a longitudinal cross-sectional view showing a nozzle adapter.

Referring to FIG. 12, there is shown one of the water nozzle adapters 4, 5 which is designed to adapt an operative connection between the warer injection nozzle 1 and the coupling assembly mounted on the part of the communication line-incorporated water hose 3 by the aid of the joints on the opposite ends thereof, and also serves to lead the electric cable 45 from the lateral surface thereof. The joint 25 may serve by itself for the connection with the water injection nozzle 1 using a normal socket joint 46, and may also be adapted to the metal coupling half 32 for the mutual connection with the communication line-incorporated water hose 3.

For this adaptation, the adapter complete 47 is formed to be identical in construction with the inner sleeve 34 on the part of the metal coupling half 32, upon which the outer sleeve 35 may be fitted snugly.

The electric cable 45 is led to the outside of the adapter complete 47 from an opening **48*a* formed therein through a passage 48 extending through the adapter complete 47, and then is connected operatively to the communication system 54**.

In this communication system 54, there are incorporated a communication set and a control for the water supply valve on the part of the fire engine, this control on the water supply valve side being specifically adapted to control the valve opening operation as well as the engine output.

The push-button type switches designated by c1 and c2 are adapted to control the opening of the water supply valve 21 and those d1 and d2 are adapted to control the engine output, respectively.

To this communication system 54, there are connected operatively a microphone 55 and a set of ear receivers 56 for the audio communication with an engineer and the like staff staying on the part of the fire engine.

Figure 13:
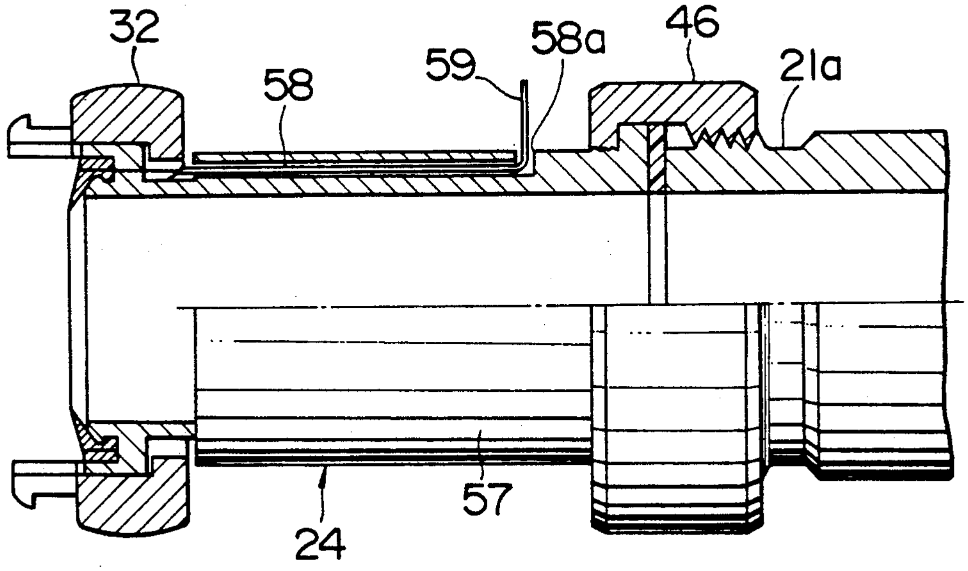
FIG. 13 is a longitudinal cross-sectional view showing a pump adapter.

FIG. 13 is a fragmentary longitudinal cross-sectional view showing the coupling adapter for use on the water pump side to be coupled to the water supply valve 21, wherein a socket joint 46 similar to the one used on the part of the water injection nozzle 1 in the nozzle coupling adapter 5 may be employed for the connection to the water outlet **21*a* of the water supply valve 21, and the coupling assembly 32 may be employed for the connection to the communication line-incorporated water hose 3**, respectively.

In the coupling adapter complete 57 of the pump side adapter 24, there is provided a longitudinal opening 58 extending along the side surface thereof, through which an electric cable 59 extends from an opening 58*a* in the lateral side of the adapter complete 57 to be led to the outside thereof.

The cable 59 led out of the opening 58*a* may be connected to the control panel 23 so that the opening of the water supply valve 21 and the engine output may be controlled by way of electric signals and also that the audio communication may be attained as desired.

Figure 14:
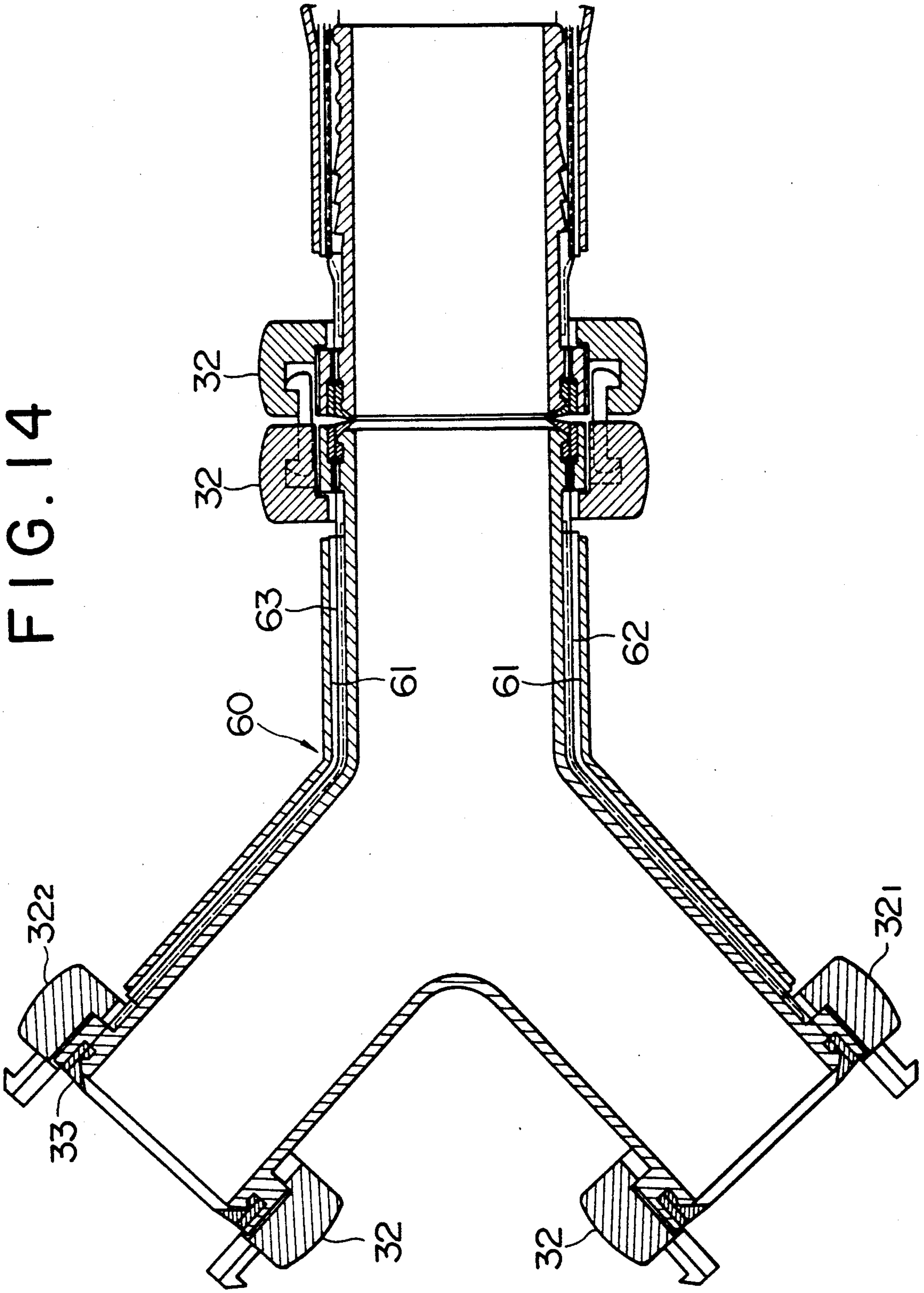
FIG. 14 is a longitudinal cross-sectional view showing a branch pipe joint.

FIG. 14 is a longitudinal cross-sectional view showing a branch pipe 60 for use in the branching of a single water hose into a dual-type water lance comprising two end nozzles 1 extending from a single water supply valve on the part of the fire engine, whereby the downstream extension of a single water hose may be branched in generally Y-shape, and wherein there are shown provided the abovementioned metal coupling assembly 32 on each of the branched ends, respectively. It is of course possible in practice to use the branch pipe 60 in the opposite way for providing a single water path gathered from two hoses extending from two supply valves.

In this branch arrangement, there are directed two electric cables 62, 63 extending through the longitudinal passages 61 provided along the branch pipe 60 from the opposite end coupling assembly 32 to be connected to the annular conductors 33 on the part of the coupling halves $32_1$ and $32_2$, so that these electric cables may be connected electrically to those on opposed coupling halves when connected together, respectively.

Figure 15:
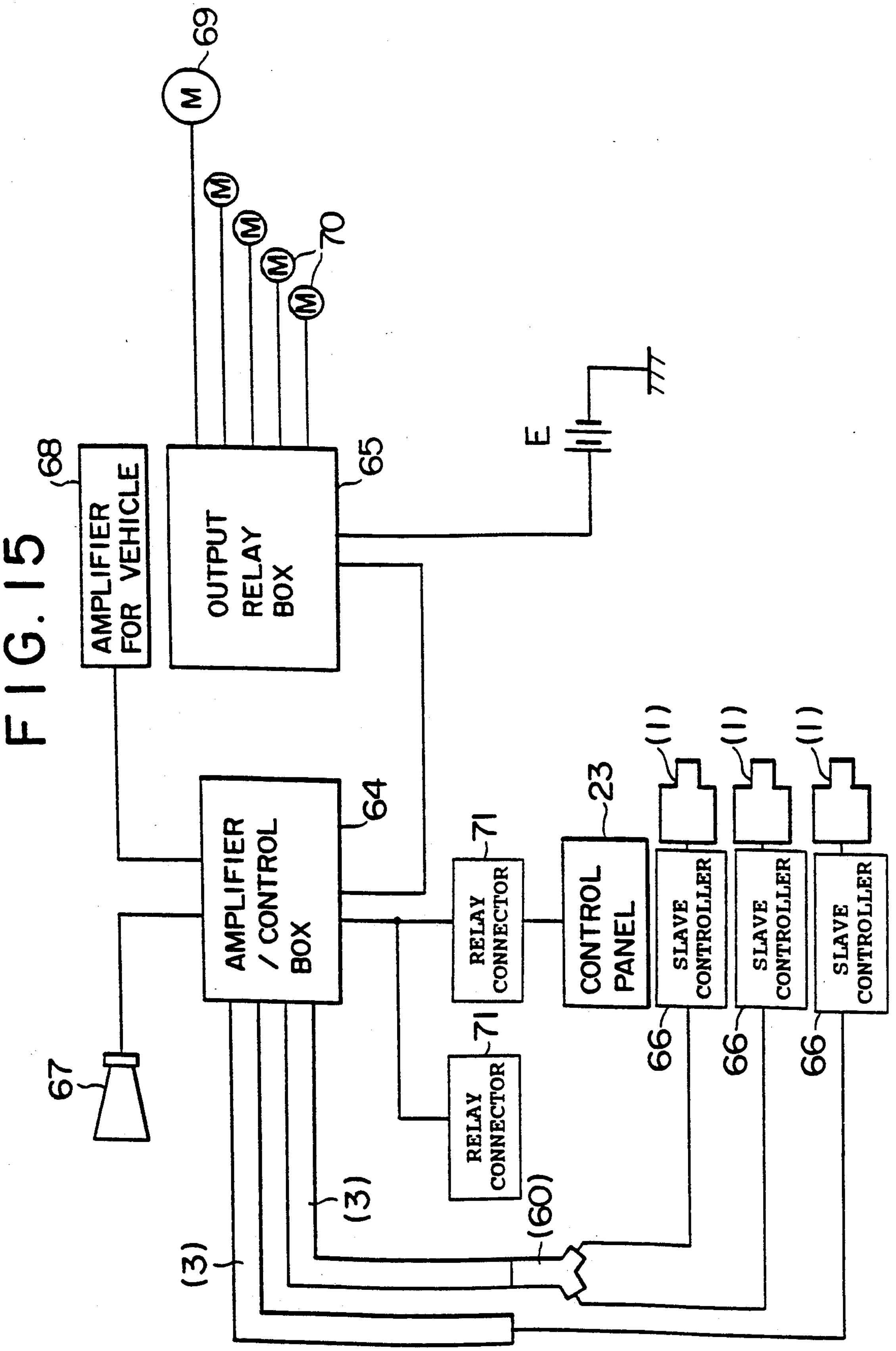
FIG. 15 is a block diagram showing the electric connection of a communication system with a communication line-incorporated water hose according to the invention.

FIG. 15 is a schematic electric circuit diagram showing the electric system employed in the communication system according to the present invention.

A control or a master controller provided on the part of a fire engine 2 comprises an amplifier control box 64, an output relay box 65 and a control panel 23.

To the amplifier control box 64, there is connected a terminal control or slave controller 66 through the communication line-incorporated water hose 3 and the branch pipe 60, the control box 64 serving to determine whether a signal from the slave controller 66 is of voice signal or of any others to produce an output accordingly. A trumpet speaker 67 is adapted to provide voices, when the signal is of the speech type. There is also provided an amplifier unit for use in vehicle 68.

The output relay box 65 is shown connected to the amplifier control box 64 to operate in such a manner that a relay may be operated to cause either an engine output control motor 69 or a valve control motor 70 to be operated, when the output from the amplifier control box 64 is of any other signals than of voice. The power for the engine output control motor 69 and the valve control motor 70, as well as for other devices may be supplied from the power battery E which is mounted on the vehicle.

Figure 16:
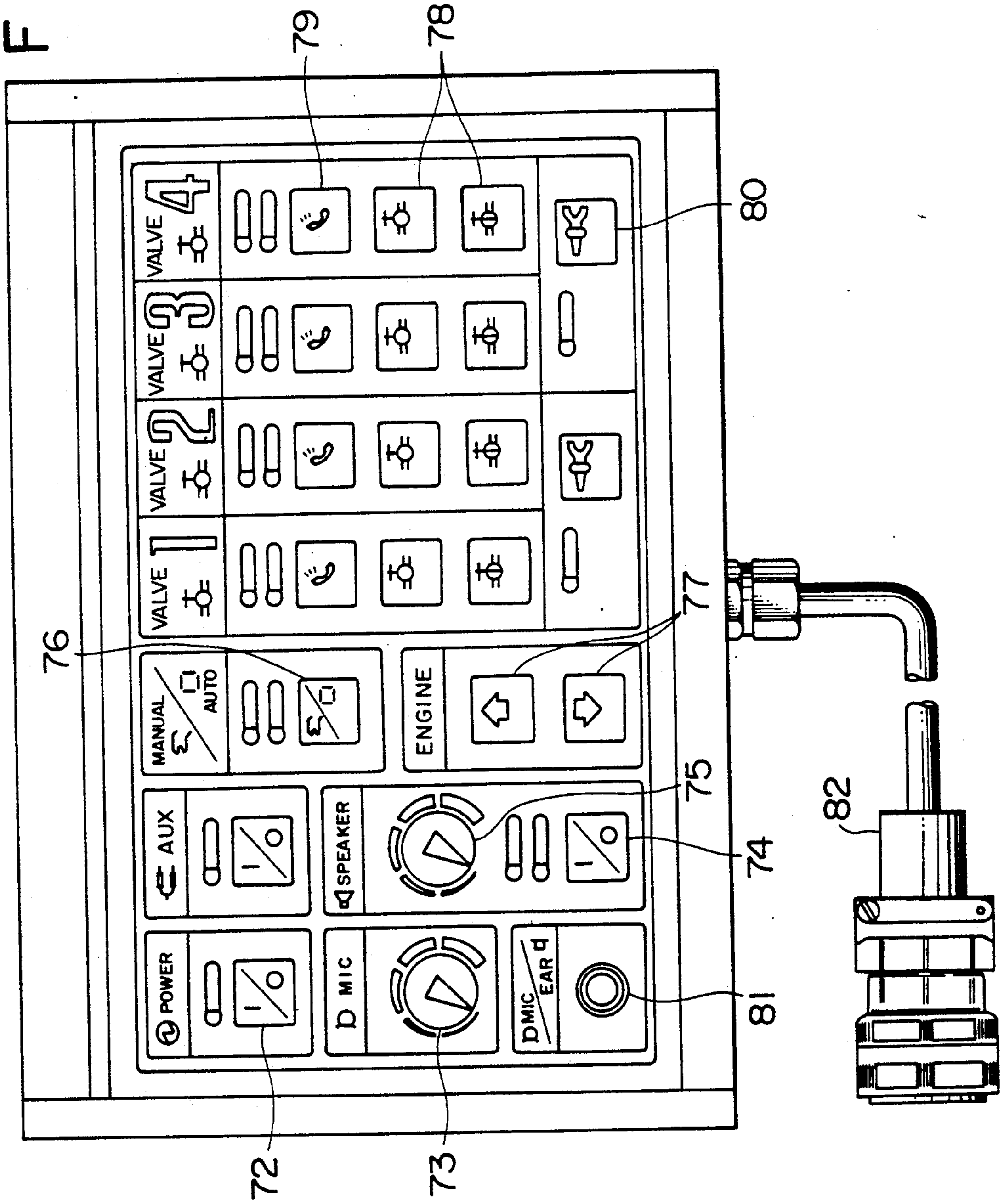
FIG. 16 is a conceptual view showing the general arrangement of a control panel.

The control panel 23 is adapted to be connected to a relay connecter box 71 which is provided on the both sides of the fire engine 2, the panel face of which is constructed as typically shown in FIG. 16.

There are shown provided a power switch designated by the reference numeral 72, a microphone volume control wheel 73, a selector switch 74 for switching to a loud speaker 67, a volume control wheel 75 for the loud speaker 67, a selector switch 76 for selecting whether the control of motor is made at the control panel or at the terminal point, a switch 77 for the control of the engine revolution, a switch 78 for the control of the valve operation, and a selector switch 79 for the voice communication. This is to specifically provide the function such that all the speech from the master unit will be transmitted to the remote speech control system, and if it is required to communicate with a specific remote speech control system, it is made available for the period of pushing the selector switch therefor.

There is also provided a switch 80 for the turning on/off of the turret for having supplied water through two branches collected together and directed through a single injection nozzle. Every time that this switch is pushed, it may be turned on and off in repetition. A microphone connector is designated by the numeral 80. Also, a connector 82 is shown to be connected to either of the right and left relay connector boxes 71.

Now, the communication system with the communication line-incorporated water hose having the construction noted above is to be explained in operation.

On an actual fire scene, the water injection nozzle 1 is adapted to direct water jet against fire, which is connected for the supply of water to the fire engine 2 by way of the communication line-incorporated water hose 3 extending therebetween. In this fire-fighting operation, the electric connection may be attained with the employment of the nozzle coupling adapters 4 and 5 for the connection to the water injection nozzle 1 and of the pump side coupling adapter 24 for the connection to the water supply valve on the fire engine, respectively. When it is required to branch water supplied from the supply valve 21, the branch pipe 60 may be used. In this case, the electric communication cables 28 may be connected operatively to each other by the coupling of the water hoses by using the coupling assembly 32 at each connection joint 25 in such a manner that these cables may safely be sealed from water running within the supply hoses.

Figure 17:
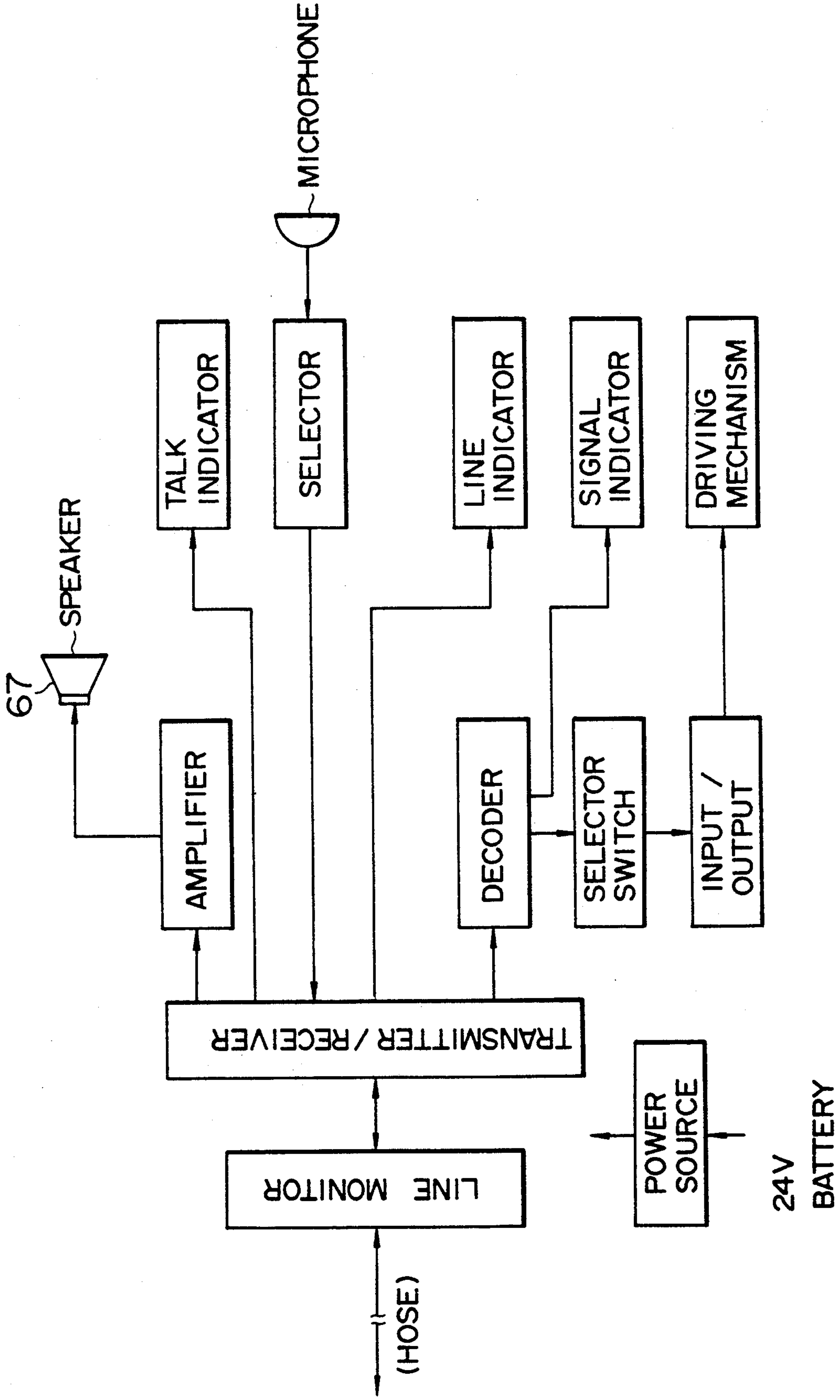
FIG. 17 is a flow chart showing the typical flow of electric signals to be transmitted and received in the communication system.

Next, reference is made firstly to FIG. 17 in connection with the communication from the terminal point control 66 to the part of the fire engine.

A fire-fighter at the leading end of the water supply hose may communicate in speech with the engineer staying on the part of the fire engine 2 by using a receiver 56 and a microphone 55 as installed in a fire-fighter's helmet or the like. Electric signal entered into the master unit on the part of the fire-engine 2 may be determined as to whether or not it is of voice signal, and if it is so, it is amplified at the signal amplifier to be outputted loudly from the loud speaker 67.

Voice signal produced from the microphone may be transmitted into the terminal control 66 by way of the communication line incorporated within the water supply hose 3 so that it may turn to audible speech to be outputted from the receiver 56.

The electric power as required for the operation of the terminal control 66 which is a slave unit may be supplied from the master unit by way of the line. That is, this may provide an advantageous two-way communication system of the type that makes the slave unit power-less by virtue of the advantageous supply wire system that makes it possible in practice to commoly supply the power and the electric signals.

According to this arrangement which takes the conveniences in use into consideration, a plurality of slave units may generally concurrently enter into communication with a master unit in such a manner that all the contents of communication may be monitored mutually satisfactorily, which would be effective in the prevention of interference or disturbance in the communication. Furthermore, there may be added such functions that make it possible for one staying on the engine side to identify a speaker from the state of an indicator lamp energized on the part of a slave unit, and if necessary, operate a selector switch to select an arbitrary party to be called for a specified communication as the case may be.

Now, the operation to control the water supply valve or the engine output from the part of the terminal control 66 will be explained, as follows.

Upon the depression of either of the switch button c1 or c2, electric signal may be sent to the master unit to be decoded for the according operation of the water supply valve 21. Also, with the depression of the switch button d1 or d2, the engine output may be adjusted as desired.

In this manner, it is now possible in practice to control a specified water supply valve so that water directed by way of a branch may be supplied with a desired pressure for a satisfactory fire-fighting operation.

Second Embodiment

Next, the present invention will be explained in detail by way of a second preferred embodiment thereof in conjunction with the accompanying drawings.

Figure 18:
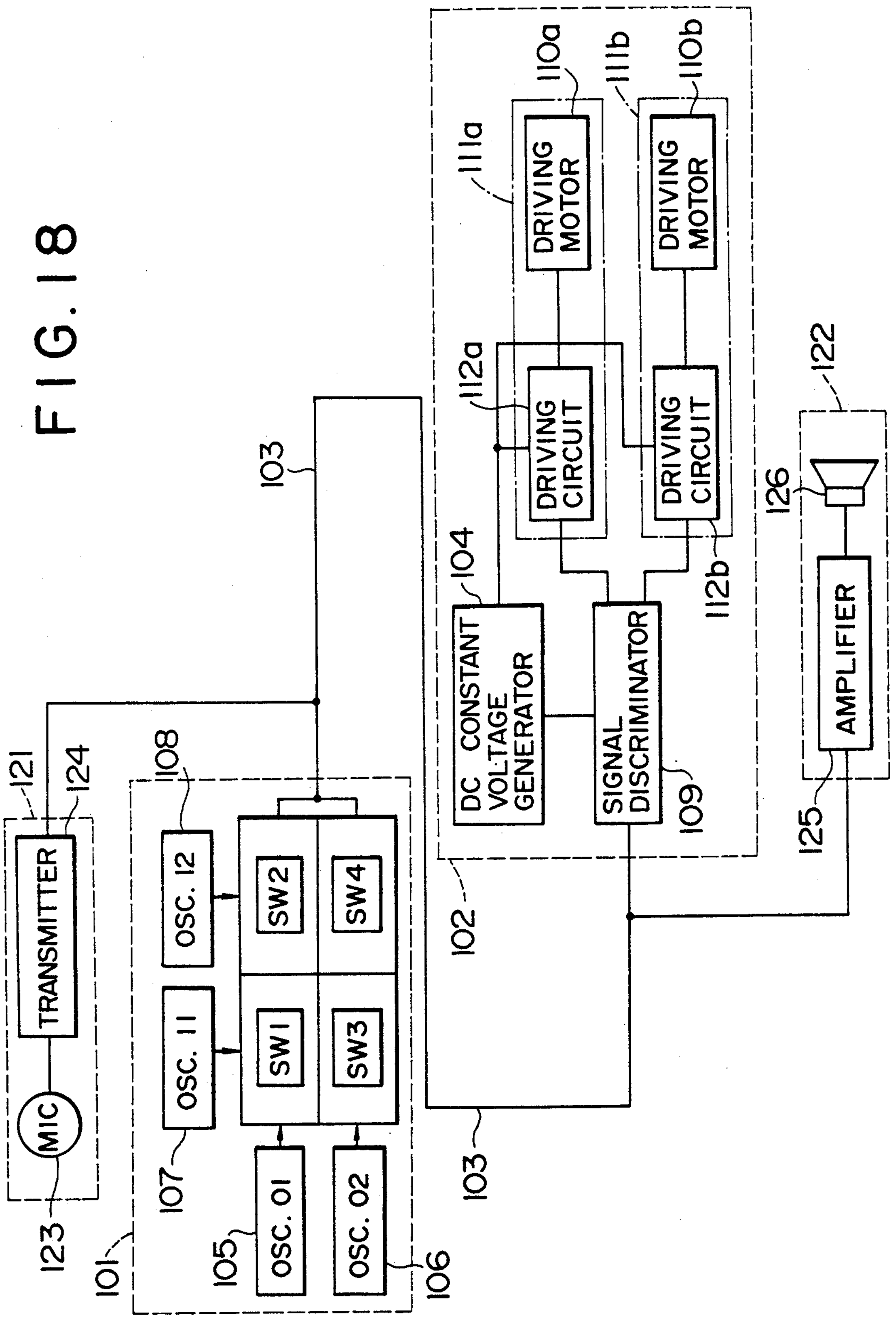
FIG. 18 is a block diagram showing by way of a second embodiment of the communication system with the line-incorporated water hose according to the invention, which may be controlled remotely from the leading end of a water hose.

FIG. 18 is a block diagram showing by way of the second embodiment of the invention the communication system with the communication line-incorporated water hose which is operable from the leading end of a water supply hose. In this drawing figure, there are shown provided a transmitter 101 on the part of a water lance or injection nozzle of a water supply hose, a receiver 102 on the part of a fire-engine, the transmitter 101 and the receiver 102 being connected operatively by way of a signal transmission line 103 of the two-line type which is embedded in the interior of the so-called fire hose system including a nozzle adapter, a fire hose, couplers, etc. The transmitter 101 is supplied with power from a DC constant-voltage generator 104 by way of the signal transmission line 103. In this respect, therefore, it may be said that the signal transmission line 103 serves commonly for the transmission of electric signals and for the supply of electric power for operation.

The transmitter 101 is adapted to generate and transmit electric signals in the manner as in the push-button type multiple-frequency coding system which is adopted in the automatic public telephone line. This transmitter 101 comprises oscillators 105, 106 for respectively oscillating relatively low voice frequencies $f_{01}$ and $f_{02}$, that is the two-lower range frequencies, and oscillators 107, 108 for respectively oscillating relatively high voice frequencies $f_{11}$ and $f_{12}$, that is the two-higher range frequencies, and four switches $SW_1$, $SW_2$, and $SW_3$ and $SW_4$ of the push-button type, for example. Referring more specifically, it is arranged such that any one of the push-button type switches $SW_1$, $SW_2$, $SW_3$ and $SW_4$ is operated to output electric signals which consist of the combination of each of frequencies as selected from the two-lower range frequencies and from the two-higher range frequencies noted above. According to this embodiment of the invention, four push-button switches are operated to provide four combinations of signals to be outputted accordingly to, for example, the state of opening/closing of the valve or increase/decrease in the engine revolution, respectively.

The receiver 102 comprises a signal discriminator 109 for discriminating of which the signal entered by way of signal transmission line 103 is, a driver 111a or 111b adapted to drive a drive motor 110a or 110b accordingly to the signals from the signal discriminator 109, and a DC constant voltage generator 104 adapted to supply electric power to such as the signal discriminator and the transmitter 101.

The signal discriminator 109 is of a circuit which is adapted to receive signals of the push-button type system from the transmitter 101, discriminate of which frequency such signals are, and output a signal, for example, a pulse-train signal while there is an input signal, and comprises a band-rejection filter for separating the lower range frequencies and the higher range frequences, a limiter for converting each of such a single frequency into a square wave, a rectifier circuit, and output signal holding logic circuit, and the like.

The drivers 111a and 111b comprises drive motors 110a, 110b, and drive circuits 112a, 112b for respectively driving the drive motors 110a and 110b by the output signal from the signal discriminator 109. These drivers 111a and 111b are adapted to adjust the opening of the water supply valve and the engine revolution, and hence, the opening of the throttle valve, respectively, to eventually control the current amount of water to be supplied, accordingly.

For the vocal communication between the point at the leading end of water supply hose and the part of a fire-engine, it is arranged such that a voice signal transmitter 121 is connected in parallel to the transmitter 101 noted above, and a voice signal receiver 122 is connected likewise in parallel to the receiver 102 noted above, the mutual communication therebetween being performed by way of the two-line type signal transmission line 103 noted above. The voice signal transmitter 121 comprises a voice electric signal converter 123 and a transmitter 124, and the voice signal receiver 122 comprises an amplifier 125 and a loud speaker 126.

Now, the second embodiment of the invention will be explained for its operation.

In order to control the current amount of water to be supplied by a single fire-fighter staying alone at a fire site, he pushes any one of the push-button type switches $SW_1$, $SW_2$, $SW_3$ and $SW_4$ mounted on the root of the water injection nozzle. If he now pushes the switch $SW_2$, in the transmitter 1, the oscillator 106 for oscillating the lower range frequencies $f_{02}$ which corresponds to the switch $SW_2$ pushed by him and the oscillator 107 for oscillating the higher range frequencies $f_{11}$ are selected to be operated so as to produce the combination of the lower range frequencies $f_{02}$ and the higher range frequencies $f_{11}$, that is an output signal $(f_{02}+f_{11})$ to be transmitted by way of the signal transmission line 103, accordingly.

This output signal which is received by the receiver 102 through the signal transmission line 103 is identified to be the signal of the frequencies $f_{02}$ and $f_{11}$ by the band-rejection filter incorporated in the signal discriminator 109 and is then converted into a square wave with a single frequency by the limiter. This is discriminated to be a signal from the push-button switch $SW_3$ which corresponds to this combination signal of the frequencies $f_{01}$ and $f_{11}$ by the rectifier and the logic circuit. Thus-discriminated output signal may be outputted while there exists an input signal in the signal discriminator 109.

The output signal from this discriminator 109 is entered to either of the driver circuits 112a and 112b to drive one of the drive motors 110a and 110b in the forward or reverse direction. Accordingly to this operation, the water supply valve is driven either in the opening direction or in the closing direction so that the current amount of water to be supplied may be increased or decreased. If the other drive motor **110*b* or the drive motor 110*a*** is connected directly to the throttle valve of the engine, its degree of opening is controlled to produce a higher or lower water pressure, thus rendering the current amount of water increased or decreased accordingly.

In this respect, therefore, if the push-button type switches $SW_1$, $SW_2$, $SW_3$ and $SW_4$ are adapted previously to comply with a certain object of operation, such as the opening/closing of the water supply valve and the opening/closing of the engine throttle valve, respectively, the selective operation of the push-button type switches $SW_1$, $SW_2$, $SW_3$ and $SW_4$ may then be correlated accordingly with an increase/decrease in the amount of water to be supplied.

Figure 19:
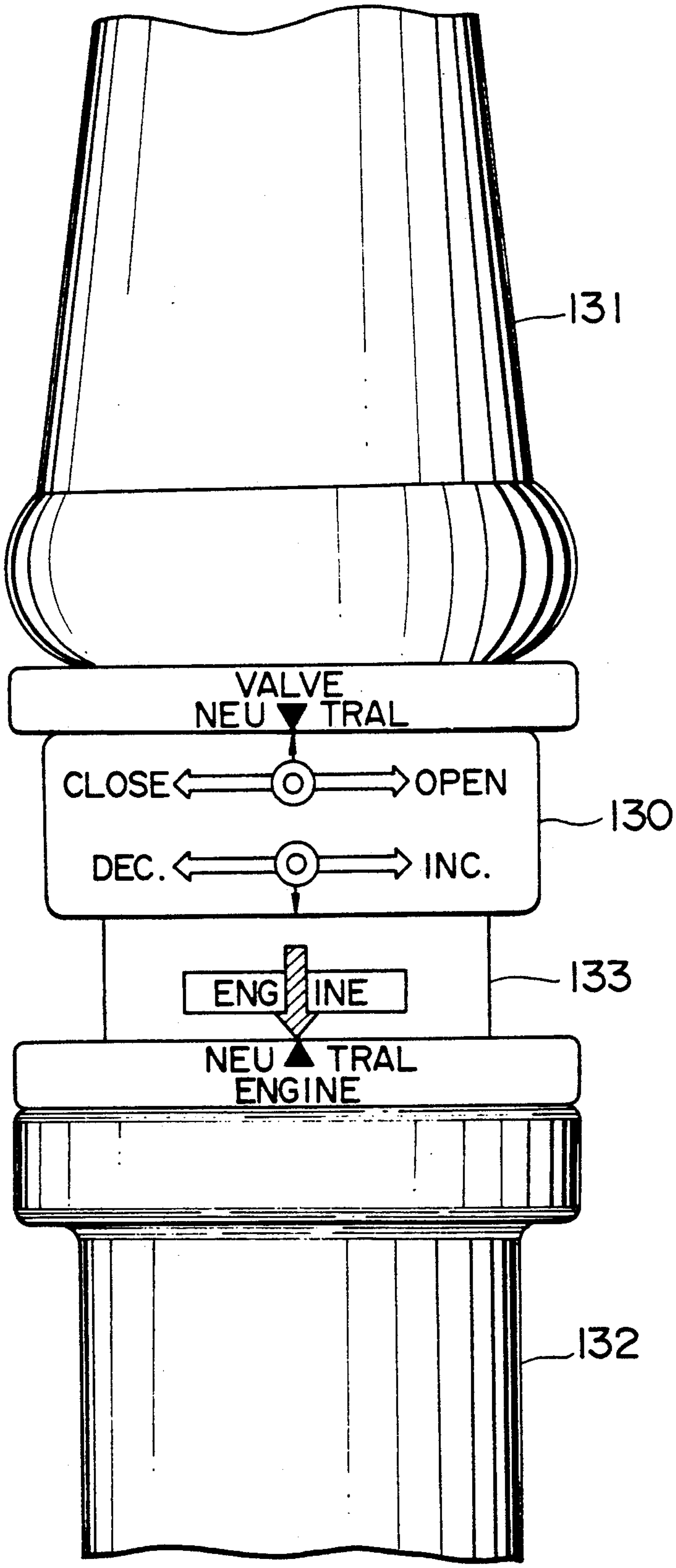
Figure 20:
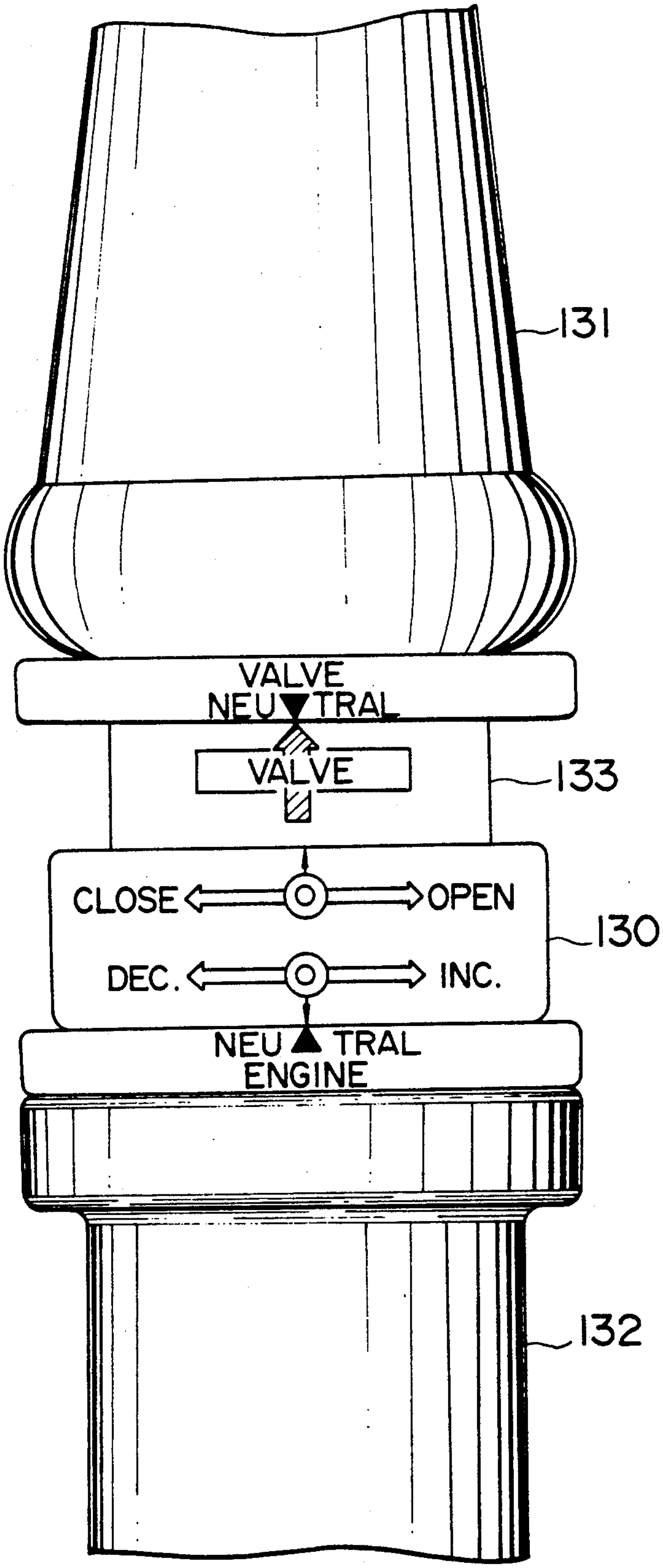
Figure 21:
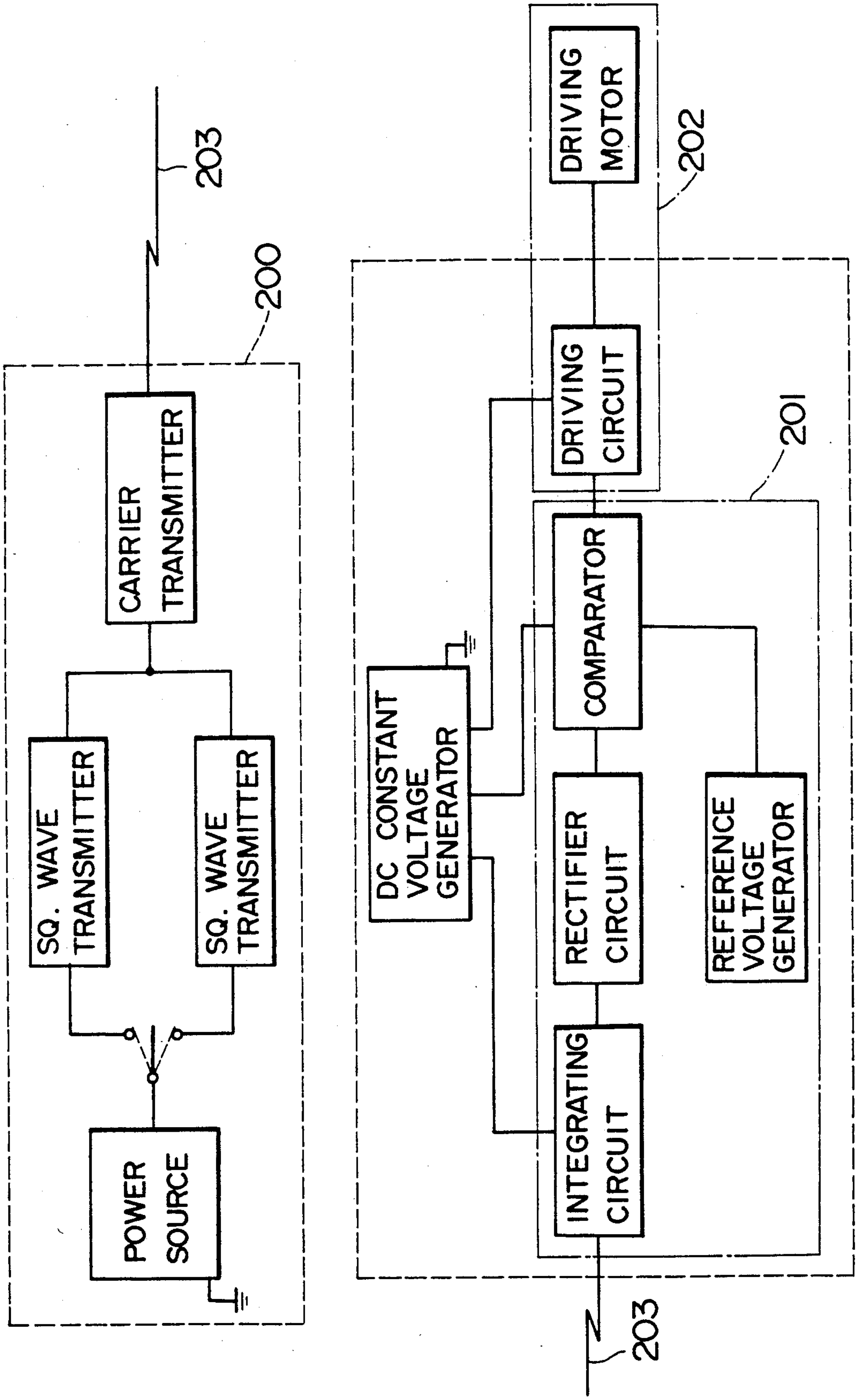
FIG. 21 (PRIOR ART)
FIG. 21 is a block diagram showing the communication system with the conventional line-incorporated water hose.

FIGS. 19 and 20 are general exterior views showing the switches mounted on the part of the water injection nozzle, which correspond in function to the abovementioned push-button type switches $SW_1$, $SW_2$, $SW_3$ and $SW_4$ noted hereinbefore. FIG. 19 shows specifically each of the neutral positions of the valves involved related to the control on the engine's revolution number by controlling the throttle valve of the engine. There is shown mounted a switch control of an annular shape 130, which is operable slidably on the coupling adapter 133 disposed between a water nozzle 131 and a hose adapter 132. Each of the switches $SW_1$, $SW_2$, $SW_3$ and $SW_4$ is mounted in position in the known manner in the interior of the switch control 130 or of the coupling adapter 133. With this arrangement, when the annular switch control 130 is shifted slidably toward the water nozzle 131, it is now allowed to operate the water supply valve to the opening and closing positions, and when shifted towards the hose adapter 132, it is then permitted to have the engine revolution number increased or decreased accordingly. While in this state shown, any of such switches are still held in their neutral positions which allows no actual operation. For doing so, the annular switch control 130 is to be turned to the left or right as viewed in the figure for the selection of a desired position. This switch control 130 may automatically return to its neutral position by way of the known construction, where no switch operation is operated. Incidentally, the electric lead wires connected to the switch control 130 and the transmitter 101 are concealed safely in a place not shown and not acceptable to any possibilities of tampering while in use.

Now, when a fire-fighter wants to control alone by himself the current amount of water to be supplied, or while he is controlling, he may communicate with the personnel on the part of the fire engine by way of the voice signal converter 123 such as a microphone or the like. His voice signal is adjusted properly by the transmitter 124 and is then transmitted to the voice signal receiver 122 by way of the signal transmission line 103. At the voice signal receiver 122, the voice signal is amplified by way of the amplifier 125, thereafter being outputted loudly from the loud speaker 126. In this manner, the personnel staying on the part of the fire engine may comply in advance with such a requirement on the fire-fighter's side as for making water supplied in an increased or decreased amount from the fire engine.

While the description as disclosed herein is essentially directed to the improvement on a communication system with the communication line-incorporated water hose, it is to be understood that the invention is not intended to be restricted in application to the fire hose for use in a fire engine and to the details of the specific constructions disclosed herein, but to contrary, the invention can of course be adapted equally to any other possible uses for a similar effect and performance in accordance with the foregoing teachings without being restricted thereto and without departing from the spirit and scope of the invention.

It is also to be understood that the appended claims are intended to cover all of such generic and specific features as are particular to the invention as disclosed herein and all statements relating to the scope of the invention, which as a matter of language might be taken to fall thereunder.

What is claimed is:

1. A cable communication system using a built-in communication line incorporated in a water-supply hose, comprising:

a nozzle adapter connected to a water injection nozzle of said water supply hose;

transmitting means disposed in said nozzle adapter including a switching element, said transmitting means selectively outputting at least two kinds of signals based on a position of said switching element;

controller means associated with a fire engine, said controller means receiving signals output from said transmitting means and discriminating between said at least two kinds of signals for driving a control motor for controlling the amount of water supplied to said water-supply hose independent upon the signal received; and a communication line incorporated in said water-supply hose, said communication line being connected to said transmitting means and said controller means for connecting said nozzle adapter and said fire engine, said communication line including a first conductor and a second conductor, said conductors being positioned in a spiral form and being disposed in coaxial arrangement to form a coaxial cable structure.

2. A cable communication system according to claim 1, wherein said water-supply hose includes a tubular hose jacket and a lining tube formed of one of plastic resin and rubber providing a lining on an interior surface of said tubular hose jacket, said communication line being disposed in a sandwich fashion between said hose jacket in said lining tube.

3. A cable communication system according to claim 1, wherein said coaxial cable structure includes a core cord and a copper wire wound spirally about said core cord, a coating provided around said wound copper wire and a second copper wire wound spirally around said coating and another coating positioned around said second wound copper wire.

4. A cable communication system according to claim 3, wherein said wound copper wire is wound in a first direction and said second copper wire is wound spirally in an opposite direction, said core cord being formed with polyester and each of said coating and said another coating being formed of polyvinyl chloride.

5. A cable communication system according to claim 1, wherein said transmitting means includes means for selectively generating sequential signals with at least two different frequencies to provide tone signals for a period of time that a switching element is being operated, said controller means including signal discriminator means to discriminate the frequency of a received signal.

6. A cable communication system according to claim 5, further comprising voice signal transmitter means including an electric voice signal conversion means connected in parallel with said transmitter means and voice signal receiver means connected in parallel with said signal discriminator means for receiving control signals and voice signals at said controller means.

7. A cable communication system according to claim 1, wherein said control motor is connected to a water supply valve for opening and closing said water supply valve to adjust the amount of water supplied.

8. A cable communication system according to claim 1, wherein said drive and control motor is connected for adjusting the opening of a throttle valve of an engine of said fire engine to change the pressure of water to control the amount of water supplied.

9. A cable communication system using a built-in communication line incorporated in a water-supply hose, comprising:

a nozzle adapter connected to a water injection nozzle of said water supply hose;

transmitting means disposed in said nozzle adapter including a switching element, said transmitting means selectively outputting at least two kinds of signals based on said switching element;

controller means associated with a fire engine, said controller means receiving signals output from said transmitting means and discriminating between said at least two kinds of signals for driving a control motor for controlling the amount of water supplied to said water-supply hose independent upon the signal received; and a communication line incorporated in said water-supply hose, said communication line being connected to said transmitting means and said controller means for connecting said nozzle adapter and said fire engine, said communication line including a first conductor and a second conductor, said conductors being positioned in a spiral form and being disposed in coaxial arrangement to form a coaxial cable structure, said transmitting means includes voice conversation means and means for selectively generating sequential signals with at least two different frequencies to provide tone signals for a period of time that a switching element is being operated, said controller means including signal discriminator means to discriminate the frequency of a received signal and voice receiver means for receiving voice signals.

* * * * *